No. 721,855. PATENTED MAR. 3, 1903.
E. BELENGER.
WHEELED TOY.
APPLICATION FILED MAR. 29, 1902.
NO MODEL.
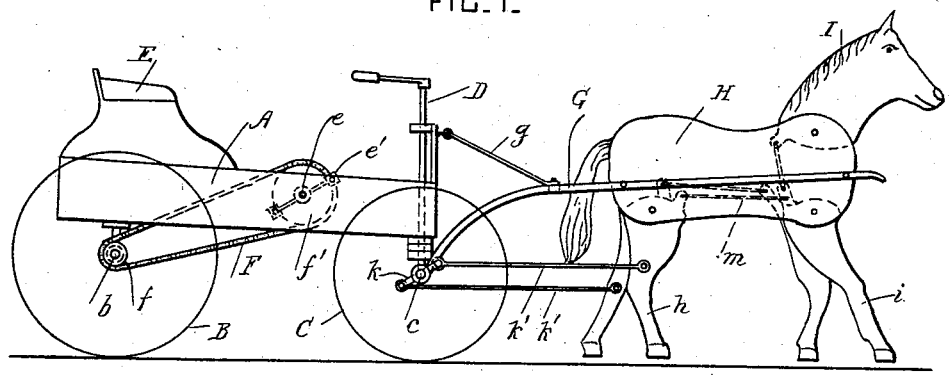
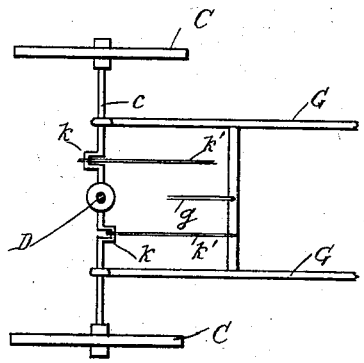
WITNESSES
INVENTOR
Excear Belenger.
by Herbert W. Jenner.
Attorney

UNITED STATES PATENT OFFICE.

EXEAR BELENGER, OF MONTREAL, CANADA.

WHEELED TOY.

SPECIFICATION forming part of Letters Patent No. 721,855, dated March 3, 1903.

Application filed March 29, 1902. Serial No. 100,595. (No model.)

*To all whom it may concern:*

Be it known that I, EXEAR BELENGER, residing at Montreal, Canada, have invented new and useful Improvements in Wheeled Toys, of which the following is a specification.

This invention relates to wheeled toys; and it consists in the novel construction and combination of the parts hereinafter fully described and claimed.

In the drawings, Figure 1 is a side view of the toy. Fig. 2 is a plan view of the steering-axle.

A is a cart or wagon, and B represents its rear and driving wheels.

C represents the front and steering wheels.

D is a steering handle-bar, which is secured to the steering-axle $c$, which carries the steering-wheels, so that the cart can be steered like a velocipede of approved construction.

E is a seat for the child, arranged in the cart, and $e$ is a driving crank-shaft, which is journaled in the cart and provided with pedals $e'$.

F is a driving chain or band, which passes over wheels or pulleys $f$ and $f'$, secured, respectively, on the axle $b$ of the driving-wheels B and on the crank-shaft $e$.

G represents the shafts or thills, which are pivoted to the steering-axle $c$ and connected to the dashboard of the cart by a brace $g$. The brace $g$ is pivotally connected with the dashboard and the shafts, so that the shafts are supported by it, but are free to move horizontally with the steering-axle when the latter is moved in the act of steering the cart.

H is the body portion of the figure of a horse or other animal, which is secured to the shafts in a natural position. This body portion is provided with hind legs $h$ and fore legs $i$, which are pivoted to it and supported by it clear of the ground.

I is the head and neck of the horse, which are pivoted to its body portion.

The hind legs $h$ are connected to cranks $k$ on the steering-axle by connecting-rods $k'$.

The various articulated members of the horse are connected together by connecting mechanism $m$, comprising rods, levers, or other equivalent devices of any approved construction.

When the cart is propelled by the child, the limbs of the horse are put in motion in a natural and attractive manner. If desired, the child can sit in the cart and be pushed along or propelled in any other manner, and the figure of the horse will be set in motion the same as when the cart is propelled by the child.

What I claim is—

The combination, with a cart provided with a dashboard, of a pivoted steering-axle provided with cranks, a steering handle-bar for oscillating the said axle so that the cart may turn corners, shafts pivoted to the said axle, a supporting-brace connected to the said shafts and pivoted to the middle and upper part of the said dashboard, the figure of an animal suspended from the said shafts and provided with articulated limbs, connecting mechanism between the said limbs, and connecting-rods between the hind legs of the animal and the said cranks, all the legs of the said animal being supported clear of the ground, substantially as set forth.

In testimony whereof I affix my signature in presence of two witnesses.

EXEAR BELENGER.

Witnesses:
  ALICE J. MURRAY,
  FRED. K. DAGGETT.